US009413945B2

(12) United States Patent
Maruyama

(10) Patent No.: US 9,413,945 B2
(45) Date of Patent: Aug. 9, 2016

(54) EXTERNAL APPARATUS AND IMAGING APPARATUS FOR CORRECTING A SHIFT IN A FOCUS POSITION CAUSED BY INSERTING OR REMOVING AN OPTICAL FILTER

(71) Applicant: CANON KABUSHIKI KAISHA, Tokyo (JP)

(72) Inventor: Naoki Maruyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/107,185

(22) Filed: Dec. 16, 2013

(65) Prior Publication Data

US 2014/0168503 A1    Jun. 19, 2014

(30) Foreign Application Priority Data

Dec. 17, 2012 (JP) ................................. 2012-274581

(51) Int. Cl.
*H04N 5/232* (2006.01)

(52) U.S. Cl.
CPC ....... *H04N 5/23212* (2013.01); *H04N 5/23206* (2013.01); *H04N 5/23209* (2013.01); *H04N 5/23245* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| 4,992,866 A * | 2/1991 | Morgan ..................... 348/159 |
| 6,046,863 A * | 4/2000 | Chino ........................ 359/697 |
| 6,850,282 B1 * | 2/2005 | Makino et al. .............. 348/371 |
| 2009/0096875 A1 * | 4/2009 | Yoshimaru et al. ........ 348/207.1 |
| 2012/0026325 A1 * | 2/2012 | Bunker et al. ............... 348/143 |

FOREIGN PATENT DOCUMENTS

| JP | 2003-262775 A | 9/2003 |
| JP | 2006-162757 A | 6/2006 |
| JP | 2011-107491 A | 6/2011 |
| JP | 2011-232615 A | 11/2011 |
| JP | 2012-032689 A | 2/2012 |

* cited by examiner

*Primary Examiner* — Albert Cutler
(74) *Attorney, Agent, or Firm* — Canon USA, Inc. IP Division

(57) ABSTRACT

A focus correction setting application is connected to an imaging apparatus such that the focus correction setting application can communicate with the imaging apparatus. The focus correction setting application holds, in a focus position correction amount table with respect to various light sources, focus position correction amounts for correcting a shift in a focus position caused by inserting or removing an optical filter into or from an optical path of a lens group of the imaging apparatus, selects a light source in a window, acquires a focus position correction amount corresponding to the selected light source among the held focus position correction amounts, and controls the imaging apparatus to correct the focus position by the acquired focus position correction amount when inserting or removing the optical filter.

14 Claims, 7 Drawing Sheets

FIG. 7

| ZOOM POSITION | FLUORESCENT LIGHT FOCUS POSITION CORRECTION AMOUNT | INCANDESCENT LIGHT ZOOM POSITION | INCANDESCENT LIGHT FOCUS POSITION CORRECTION AMOUNT | INFRARED ILLUMINATION (850 nm) ZOOM POSITION | INFRARED ILLUMINATION (850 nm) FOCUS POSITION CORRECTION AMOUNT | INFRARED ILLUMINATION (950 nm) ZOOM POSITION | INFRARED ILLUMINATION (950 nm) FOCUS POSITION CORRECTION AMOUNT |
|---|---|---|---|---|---|---|---|
| 1 | 40 | 1 | 36 | 1 | 13 | 1 | 4 |
| 2 | 36 | 2 | 31 | 2 | 10 | 2 | 1 |
| 3 | 33 | 3 | 24 | 3 | 7 | 3 | −2 |
| 4 | 31 | 4 | 21 | 4 | 4 | 4 | −5 |
| 5 | 29 | 5 | 20 | 5 | 1 | 5 | −9 |
| ... | ... | ... | ... | ... | ... | ... | ... |

EXTERNAL APPARATUS AND IMAGING APPARATUS FOR CORRECTING A SHIFT IN A FOCUS POSITION CAUSED BY INSERTING OR REMOVING AN OPTICAL FILTER

BACKGROUND OF THE INVENTION

1. Field of the Invention

The present invention relates to an external apparatus and an imaging apparatus that can correct a shift in a focus position caused by inserting or removing an optical filter.

2. Description of the Related Art

Conventionally, a camera uses an optical filter such as an infrared cut-off filter (hereinafter referred to as an "IRCF") to block light of predetermined wavelengths in the light incident on the camera through a lens. For example, the light from an object goes through the IRCF, and this can prevent an image from becoming reddish, so that the image is similar to that viewed with the human eyes.

Further, the following camera is known. To enable the capturing of a bright image even under a low-illuminance environment, an IRCF mounted on a camera can be removed from the optical path of an imaging optical system to introduce also light of wavelengths in the infrared range into a sensor.

Generally, such a function is termed a "day/night function". Under an environment where the object is bright, the object is captured in a day mode where the IRCF is inserted into the optical path. On the other hand, under an environment where the object is dark, the object is captured in a night mode where the IRCF is removed from the optical path.

In the state of the night mode where the IRCF is removed, light in the infrared range enters the sensor. Thus, the wavelength components of the incident light are different from those when the IRCF is inserted. Changes in the wavelengths of the light incident on the sensor may change the focus position. This may result in a defocused image.

Japanese Patent Application Laid-Open No. 2012-032689 discusses an imaging apparatus that receives wavelength information of near-infrared light through an operation unit provided in a lens system, and places on the optical axis a band-pass filter that transmits light of the received wavelength information. Further, the imaging apparatus reads from a memory an optical axis position corresponding to the received wavelength information and an optical axis position of a variable magnification lens, and locates a rear lens group at the read optical axis position, thereby preventing the influence of a focus shift.

Further, Japanese Patent Application Laid-Open No. 2006-162757 discusses a television camera that calculates correction data from the thicknesses and the refractive indices of an IRCF and clear glass, and displaces a tracking lens using the calculated correction data. The correction data is used to correct the change in the optical length due to the difference between the thicknesses of the IRCF and the clear glass. The IRCF is placed on the optical axis in a normal photographing mode, and the clear glass is placed on the optical axis in a near-infrared photographing mode.

In the conventional art discussed in Japanese Patent Application Laid-Open Nos. 2012-032689 and 2006-162757, however, the amount of correction of the focus position is determined within the camera. Thus, a camera without the function of determining such an amount of correction cannot correct the focus position. Further, a target light source may not be assumed in advance by a camera.

SUMMARY OF THE INVENTION

The present invention is directed to an external apparatus and an imaging apparatus that can determine a correction amount for correcting a shift in a focus position caused by inserting or removing an optical filter.

According to an aspect of the present invention, an external apparatus capable of communicating with an imaging apparatus that corrects a shift in a focus position caused by inserting or removing an optical filter into or from an optical path of an imaging optical system includes a selection unit configured to allow a user to select a light source for an object of the imaging apparatus, a determination unit configured to, based on a zoom position of the imaging apparatus and the light source selected using the selection unit, determine a correction amount for correcting the shift, and a transmission unit configured to transmit the correction amount determined by the determination unit to the imaging apparatus.

According to another aspect of the present invention, an external apparatus capable of communicating with an imaging apparatus that corrects a shift in a focus position caused by inserting or removing an optical filter into or from an optical path of an imaging optical system includes a selection unit configured to allow a user to select a light source for an object of the imaging apparatus, and a transmission unit configured to transmit, to the imaging apparatus, light source information that represents the light source selected using the selection unit and is used together with a zoom position of the imaging apparatus to determine a correction amount for correcting the shift.

According to yet another aspect of the present invention, an imaging apparatus capable of communicating with an external apparatus includes an imaging optical system, an optical filter, an insertion/removal unit configured to insert or remove the optical filter into or from an optical path of the imaging optical system, a reception unit configured to receive light source information representing a light source for an object of the imaging apparatus from the external apparatus, and a determination unit configured to, based on a zoom position of the imaging apparatus and the light source information received by the reception unit, determine a correction amount for correcting a shift in a focus position caused by the insertion/removal unit inserting or removing the optical filter.

According to an exemplary embodiment of the present invention, it is possible to determine a correction amount for correcting a shift in a focus position caused by inserting or removing an optical filter.

Further features of the present invention will become apparent from the following description of exemplary embodiments with reference to the attached drawings.

BRIEF DESCRIPTION OF THE DRAWINGS

FIG. 7 is a diagram illustrating a focus position correction amount table according to the exemplary embodiment of the present invention.

DESCRIPTION OF THE EMBODIMENTS

Figure 1:
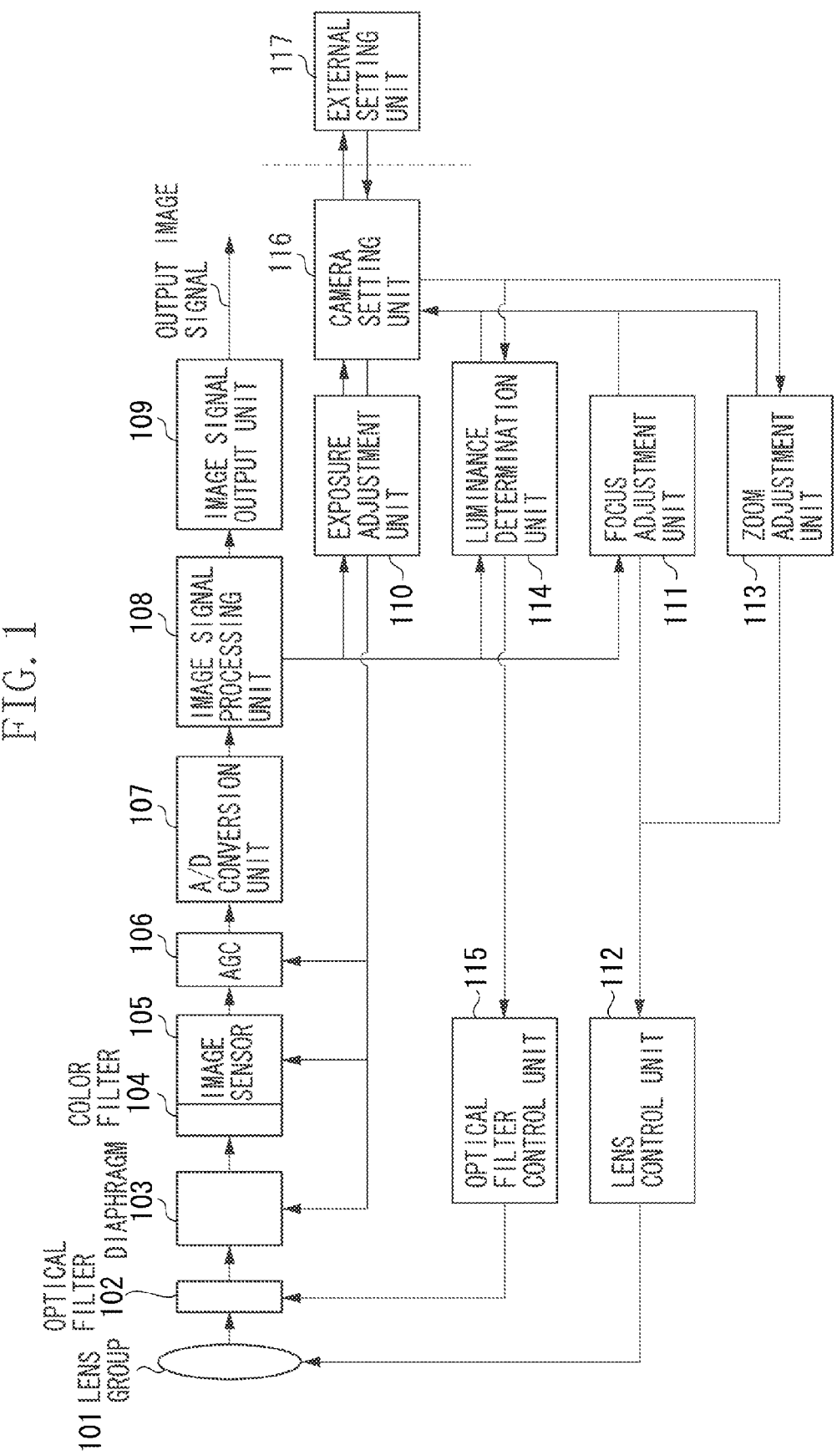
FIG. 1 is a block diagram illustrating a configuration for controlling an imaging apparatus according to an exemplary embodiment of the present invention.

Various exemplary embodiments, features, and aspects of the invention will be described in detail below with reference to the drawings. FIG. 1 is a block diagram illustrating a configuration for controlling an imaging apparatus 1 according to an exemplary embodiment of the present invention.

The imaging apparatus 1 according to the present exemplary embodiment includes components illustrated in FIG. 1, except for an external setting unit 117. The imaging apparatus 1 according to the present exemplary embodiment is a network camera, which is used as a monitoring camera. The imaging apparatus 1, however, is not limited to this. The imaging apparatus 1 may be, for example, a video camera.

In FIG. 1, a lens group 101 is an imaging optical system that concentrates the incident light from an object onto an image sensor 105. The lens group 101 includes a focus lens for bringing the object into focus, and a zoom lens for adjusting the angle of view.

The light having entered the imaging apparatus 1 through the lens group 101 passes through an optical filter 102, and thereafter, the amount of light is adjusted by a diaphragm 103. The diaphragm 103 is used to adjust the amount of light incident on the image sensor 105.

In the present exemplary embodiment, the optical filter 102 is, for example, an IRCF, but is not limited to this. The optical filter 102 may be, for example, a neutral density (ND) filter, or a band-pass filter that transmits light in a predetermined wavelength range.

The light, the amount of which has been adjusted by the diaphragm 103, passes through a color filter 104, in which colors are arranged in a predetermined order for each pixel of a light receiving surface of the image sensor 105. Then, the light is received by the image sensor 105. The image sensor 105 generates an imaging signal from the received light and outputs the imaging signal as an analog signal. Then, automatic gain control (AGC) 106 controls the gain of the imaging signal generated by the image sensor 105, thereby adjusting the luminance of the imaging signal. Then, an analog-to-digital (A/D) conversion unit 107 converts the imaging signal into a digital signal.

An image signal processing unit 108 performs predetermined processing on the imaging signal output from the A/D conversion unit 107, and outputs a luminance signal and a color signal for each pixel. The image signal processing unit 108 generates an image to be output and also generates parameters for controlling the camera. Examples of the parameters for controlling the camera include a parameter used to control the diaphragm 103, a parameter used to control focusing, and a parameter used to control the white balance, which adjusts the tint.

An image signal output unit 109 outputs to outside the imaging apparatus 1 the image signal output from the image signal processing unit 108. An exposure adjustment unit 110 calculates information about luminance in a capturing screen from the luminance signal output from the image signal processing unit 108, and controls the diaphragm 103 and the AGC 106 to adjust the brightness of the captured image to a desired brightness. Further, the exposure adjustment unit 110 can also adjust the shutter speed to adjust the accumulation time of the image sensor 105, thereby adjusting the brightness of the captured image.

A focus adjustment unit 111 performs the following focusing operation. Specifically, the focus adjustment unit 111 extracts a high-frequency component from the image signal output from the image signal processing unit 108, and uses the value of the extracted high-frequency component as focus information (a focus evaluation value) to set a focus lens position such that the focus evaluation value is maximum.

Further, the focus adjustment unit 111 controls a lens control unit 112 to locate the focus lens at the set focus lens position. At this time, the lens control unit 112 controls the position of the lens group 101. Further, the focus adjustment unit 111 has a focus position shift correction function for correcting the shift in the focus position caused by inserting or removing the optical filter 102 into or from the optical path of the lens group 101.

For example, by using the focus position shift correction function, the focus adjustment unit 111 calculates, from parameters such as the light source for and the zoom position of the imaging apparatus 1, a focus position correction amount for correcting the shift. Then, according to the insertion or removal of the optical filter 102, the focus adjustment unit 111 adjusts the focus position of the imaging apparatus 1 using the calculated focus position correction amount.

Such a focus position correction amount changes due to changes in the values of parameters such as the light source, the zoom position, the focus position, the diaphragm, and the temperature of the imaging apparatus 1.

A zoom adjustment unit 113 sets the position of the zoom lens and controls the lens control unit 112, thereby moving the zoom lens. A luminance determination unit 114 determines the brightness of the object, determines whether to insert or remove the optical filter 102, and controls an optical filter control unit 115, thereby inserting or removing the optical filter 102.

If the luminance determination unit 114 has determined that the brightness of the object is not greater than a predetermined brightness with the optical filter 102 inserted into the optical path of the lens group 101, the optical filter control unit 115 removes the optical filter 102 from the optical path of the lens group 101. If, on the other hand, the luminance determination unit 114 has determined that the brightness of the object is greater than the predetermined brightness with the optical filter 102 removed from the optical path of the lens group 101, the optical filter control unit 115 inserts the optical filter 102 into the optical path of the lens group 101.

If the imaging apparatus 1 has been instructed from outside the imaging apparatus 1 to insert or remove the optical filter 102, the imaging apparatus 1 inserts or removes the optical filter 102 by giving priority to the instruction over the determination of the luminance determination unit 114.

A camera setting unit 116 has the function of managing the current camera status, and the function of making camera settings based on a camera control command given from outside the imaging apparatus 1. The "camera status" refers to information representing the state of the imaging apparatus 1. Examples of the state of the imaging apparatus 1 include the zoom position, the focus position, diaphragm information, the state of insertion or removal of the optical filter 102, and the focus mode (autofocus (hereinafter referred to as "AF") and manual focus (hereinafter referred to as "MF")).

Further, the "camera settings" are used to make camera settings such as the focus mode setting (AF and MF), the specifying of the focus position, the specifying of the zoom position, and the specifying of the diaphragm.

The external setting unit 117 is a collective term of a setting unit for making camera settings for the imaging apparatus 1. The setting unit includes an application for causing the imaging apparatus 1 to make a focus correction as described above. Further, the external setting unit 117 is connected to the imaging apparatus 1 installed in a remote place, such that the external setting unit 117 can communicate with the imaging apparatus 1 via a network.

Further, the external setting unit 117 includes a display unit. The display unit displays an image corresponding to the image signal output from the image signal output unit 109.

The external setting unit 117 according to the present exemplary embodiment is a personal computer that operates an application for performing general camera operations such as the focusing, the specifying of the brightness, the specifying of the zoom position, and pan and tilt operations. Further, in the present exemplary embodiment, an imaging system includes the imaging apparatus 1 and the external setting unit 117.

Figure 2:
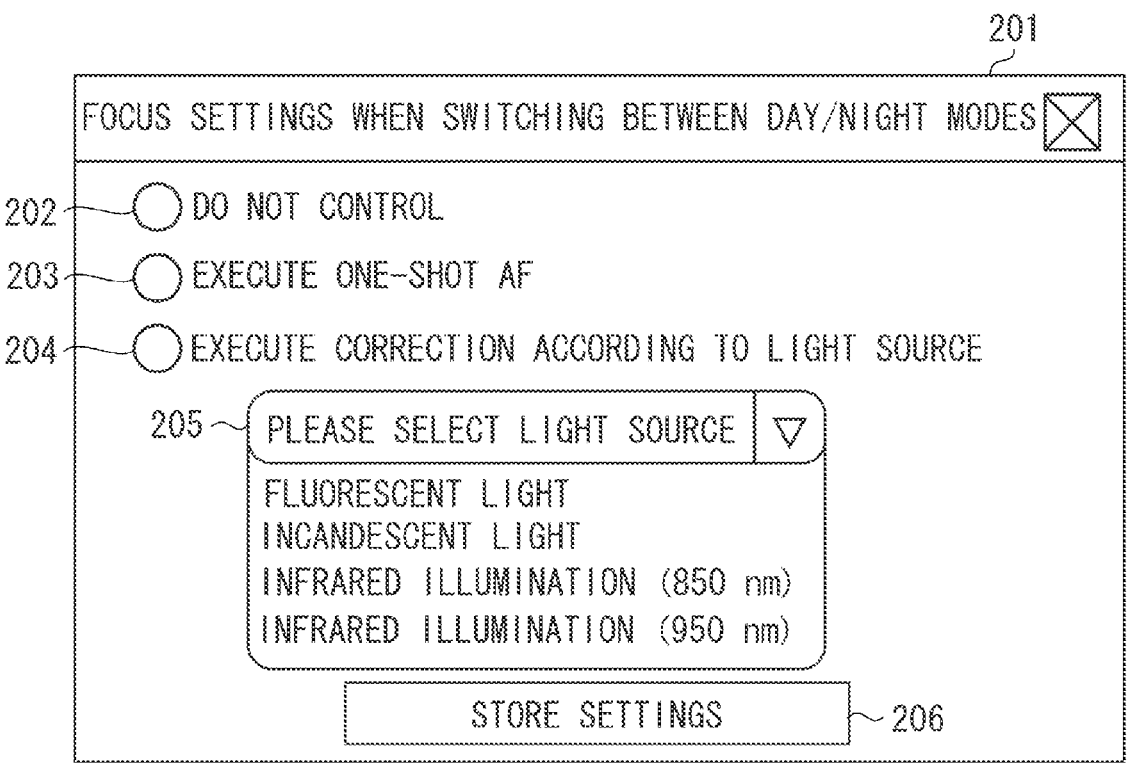
FIG. 2 is a diagram illustrating the screen of a "focus settings when switching between day/night modes" application according to the exemplary embodiment of the present invention.
Figure 6:
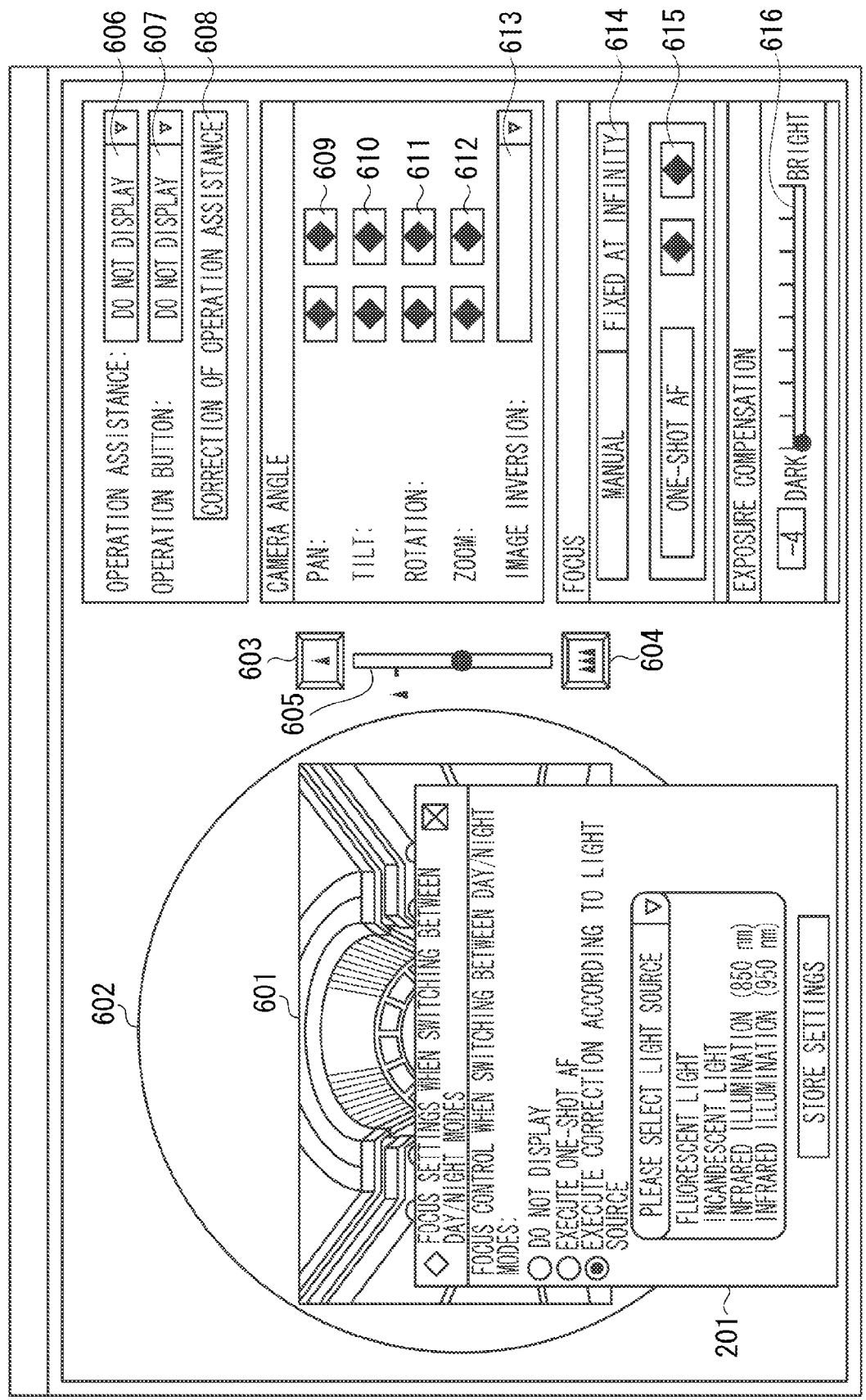
FIG. 6 is a diagram illustrating a focus correction setting application according to the exemplary embodiment of the present invention.

Next, with reference to FIGS. 2 and 6, a description is given of a focus correction setting application for making settings regarding a focus correction when inserting or removing the optical filter 102 into or from the optical path of the lens group 101. The focus correction setting application is an application that operates on the external setting unit 117.

FIGS. 2 and 6 illustrate, as examples of the focus correction setting application, the screens of a "focus settings when switching between day/night modes" application for making focus settings when switching between day and night modes. Further, the screens illustrated in FIGS. 2 and 6 are displayed on the display unit of the external setting unit 117.

In FIG. 6, an image display unit 601 displays an image corresponding to an image signal transmitted from the image signal output unit 109 via the network. Then, a rotation operation unit 602 and a rotation button 611 serve as an operation unit for rotating an imaging unit of the imaging apparatus 1 about the optical axis of the lens group 101. Further, zoom buttons 603, 604, and 612, and a zoom slider 605 serve as an operation unit for setting the zoom position of the imaging apparatus 1.

The imaging unit of the imaging apparatus 1 according to the present exemplary embodiment includes the lens group 101, the optical filter 102, the diaphragm 103, the color filter 104, and the image sensor 105. The imaging unit of the imaging apparatus 1 captures an object to generate an imaging signal. Further, the zoom buttons 603, 604, and 612, and the zoom slider 605 according to the present exemplary embodiment correspond to a zoom position setting unit for setting the zoom position of the imaging apparatus 1.

An operation assistance selection unit 606 is an operation unit for choosing whether to display on the image display unit 601 the range where the pan and tilt operations can be performed. A "correction of operation assistance" operation unit 608 is an operation unit for correcting the range where the pan and tilt operations can be performed, to match the actual capturing direction of the imaging apparatus 1 when the range is displayed on the image display unit 601.

An operation button selection unit 607 is an operation unit for choosing whether to display a pan button 609 and a tilt button 610.

The pan button 609 is an operation unit for rotating the imaging unit of the imaging apparatus 1 in a pan direction. The tilt button 610 is an operation unit for rotating the imaging unit of the imaging apparatus 1 in a tilt direction. An image inversion selection unit 613 is an operation unit for selecting the direction of the image of the imaging apparatus 1. For example, if a user has selected "invert", the imaging apparatus 1 outputs the image by rotating the image 180 degrees.

A focus operation unit 614 is an operation unit for, for example, adjusting the focus to any position by a manual operation or fixing the focus at infinity. Further, a "one-shot AF" operation unit 615 is configured such that if the user has pressed a button of the operation unit 615, autofocus can temporarily operate to focus. An exposure compensation operation unit 616 is an operation unit for setting the brightness of the image of the imaging apparatus 1. A window 201 in FIG. 6 is described in detail with reference to FIG. 2.

As illustrated in FIG. 2, the window 201 of the focus correction setting application allows the selection of focus control according to the switching between the day and night modes in the imaging apparatus 1.

Specifically, the window 201 displays radio buttons 202, 203, and 204. The radio button 202 is associated with the item "do not control", the radio button 203 is associated with the item "execute one-shot AF", and the radio button 204 is associated with the item "execute correction according to light source". That is, the window 201 is a menu screen that allows the selection of these three items.

Each of the items is described here. The item "do not control" is used to instruct the imaging apparatus 1 not to adjust the focus, or to correct the focus by the focus position correction amount determined in advance. For example, if this item has been selected, the imaging apparatus 1 does not adjust the focus when switching between the day and night modes, or corrects the focus position according to the light source determined in advance as a default setting.

Next, the item "execute one-shot AF" is used to instruct the imaging apparatus 1 to focus by performing an AF operation only once when switching between the day and night modes.

Then, the item "execute correction according to light source" is an item to be selected when the light source irradiating the object of the imaging apparatus 1 is known in advance. The user selects this item and also selects the light source, and thereby can instruct the imaging apparatus 1 to appropriately correct the amount of correction of the focus according to the differences between the wavelengths of light sources.

A pull-down menu 205 displays selectable types of light sources. In the present exemplary embodiment, the displayed types of light sources are fluorescent light, incandescent light (halogen light), infrared illumination (850 nm), and infrared illumination (950 nm), but are not limited to these. The types of light sources may include, for example, mercury light, sodium light, warm-colored fluorescent light, white-colored fluorescent light, and daylight-colored fluorescent light.

Further, a setting storage button 206 is a button for storing in the imaging apparatus 1 the focus settings when switching between the day and night modes.

In the present exemplary embodiment, the focus correction setting application is configured to display the image display unit 601 together with the window 201. Thus, the focus correction setting application according to the present exemplary embodiment has a display control function for, when the type of light source is selected using the pull-down menu 205, causing the image display unit 601 to display an image corresponding to an image signal transmitted from the image signal output unit 109 via the network.

Similarly, in the present exemplary embodiment, the focus correction setting application is configured to display the zoom buttons 603, 604, and 612, and the zoom slider 605 together with the window 201. Thus, when the zoom position of the imaging apparatus 1 is set using the zoom button 603 or the other buttons, the focus correction setting application according to the present exemplary embodiment causes the image display unit 601 to display an image corresponding to an image signal transmitted from the image signal output unit 109 via the network.

Further, in the present exemplary embodiment, the focus correction setting application is configured such that, regardless of the presence of the display of the window 201, the zoom position of the imaging apparatus 1 can always be changed using the zoom buttons 603, 604, and 612, and the zoom slider 605.

If, however, the zoom position of the imaging apparatus 1 has been changed, for example, the object may include a new light source that had not been included in the object before the change. Thus, if the zoom position of the imaging apparatus 1 has been set after the type of light source had been selected, it may be necessary to select the type of light source anew, which is cumbersome to the user.

Thus, to remove this cumbersomeness, the focus correction setting application may be configured as follows.

That is, the focus correction setting application may be configured such that after the zoom position of the imaging apparatus 1 has been set using the zoom buttons 603, 604, and 612, and the zoom slider 605, the focus correction setting application displays the window 201 to allow the user to select the type of light source using the pull-down menu 205. Further, the focus correction setting application may be configured such that if the window 201 is being displayed, the focus correction setting application prohibits the zoom position of the imaging apparatus 1 from being set, and if the window 201 is not being displayed, the focus correction setting application cancels this prohibition.

Also when the imaging unit of the imaging apparatus 1 is rotated in the pan and tilt directions, the focus correction setting application may be configured similarly to the setting of the zoom position of the imaging apparatus 1.

Further, in the present exemplary embodiment, one external setting unit 117 is connected to the imaging apparatus 1 such that the external setting unit 117 can communicate with the imaging apparatus 1. Alternatively, it can also be assumed that a plurality of external setting units 117 are connected to the imaging apparatus 1 such that the external setting units 117 can communicate with the imaging apparatus 1. In this case, while the type of light source is being selected in one of the external setting units 117, the zoom position or the capturing direction of the imaging apparatus 1 may be changed in another one of the external setting units 117.

As described above, if, while the type of light source is being selected in one external setting unit 117, the zoom position or the capturing direction of the imaging apparatus 1 has been changed in another external setting unit 117, it may be necessary to select the type of light source anew, which is cumbersome to the user.

Thus, to remove this cumbersomeness, the focus correction setting application may be configured as follows.

That is, the focus correction setting application may be configured such that if the focus correction setting application has been started or the window 201 is being displayed in one external setting unit 117, the focus correction setting application controls the imaging apparatus 1 to reject the connection from another external setting unit 117.

Further, the focus correction setting application may be configured such that if the display of the window 201 has been stopped or the focus correction setting application has been ended in the one external setting unit 117, the focus correction setting application controls the imaging apparatus 1 to permit the connection from the other external setting unit 117.

Further, in the present exemplary embodiment, the focus correction setting application may be configured such that if the zoom position or the capturing direction has been changed after the type of light source had been selected and also after the focus position correction amount had been transmitted to the imaging apparatus 1, the focus correction setting application displays a dialog or a message prompting the user to reset the type of light source.

Further, in the present exemplary embodiment, the imaging apparatus 1 is configured such that in the state where the optical filter 102 is removed from the optical path of the lens group 101, dummy glass is inserted into the optical path of the lens group 101 to absorb the change in the optical path length due to the removal of the optical filter 102. The imaging apparatus 1, however, is not limited to such a configuration. For example, such dummy glass may not be provided in the imaging apparatus 1.

Detailed descriptions are given below of a method of making settings regarding a focus correction according to the differences between the wavelengths of light sources using the imaging apparatus 1 and the focus correction setting application according to the present exemplary embodiment. The descriptions are given as a first exemplary embodiment, a second exemplary embodiment, and a third exemplary embodiment.

Figure 3:
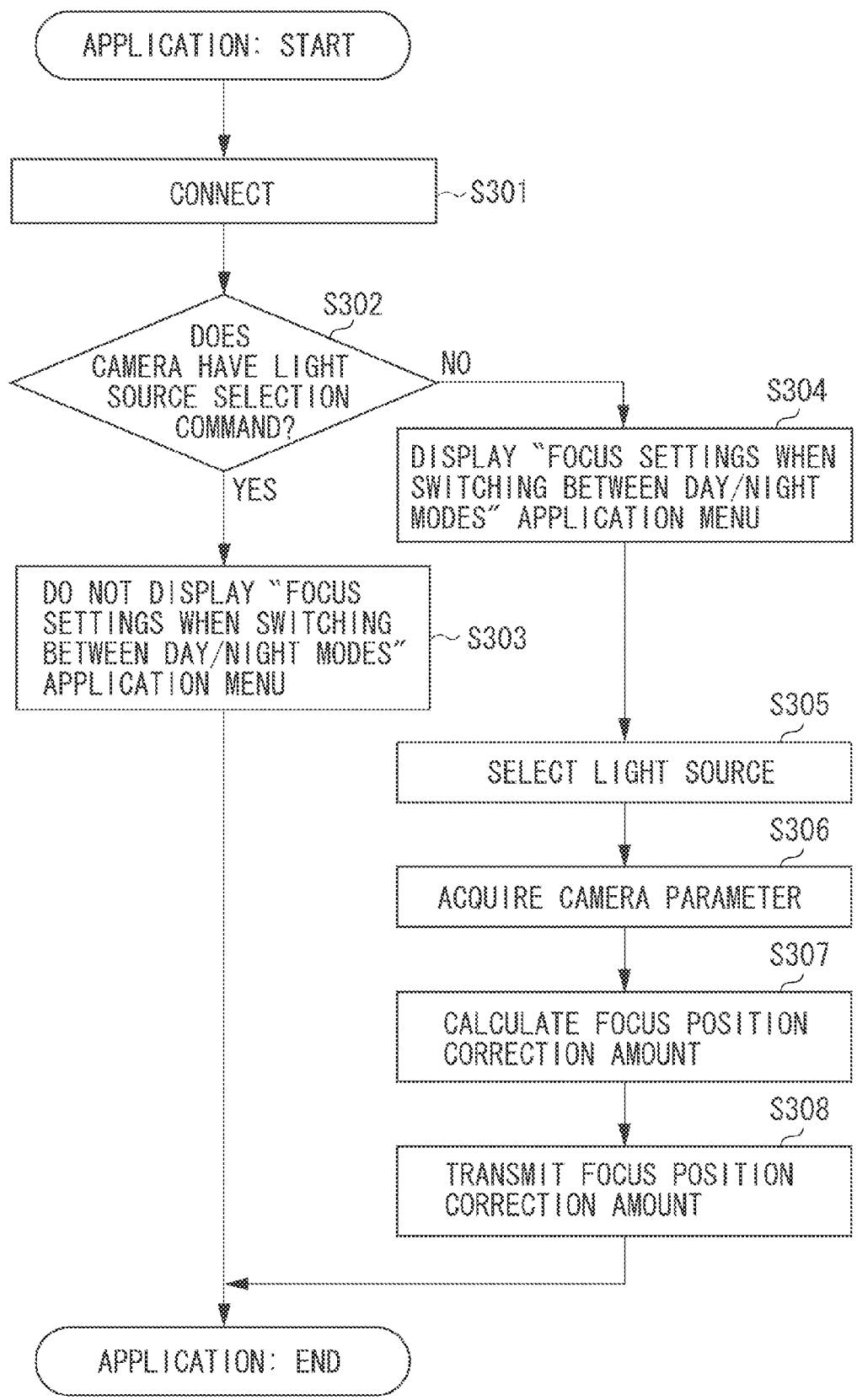
FIG. 3 is a flow chart illustrating a focus position correction process when switching between day and night modes, according to a first exemplary embodiment of the present invention.

With reference to FIG. 3, a description is given of a method of making settings regarding a focus correction when switching between the day and night modes, according to the first exemplary embodiment of the present invention. The components redundant with those of the above exemplary embodiment are designated by the same numerals, and the descriptions of the redundant components are appropriately omitted.

FIG. 3 is a flow chart illustrating a focus position correction process when switching between the day and night modes, the process performed on the imaging apparatus 1. This process is performed by the focus correction setting application and is started when the focus correction setting application has been started. Further, the focus correction setting application is executed by a control unit (not illustrated) of the external setting unit 117.

In FIG. 3, in step S301, the focus correction setting application connects to the imaging apparatus 1 such that the focus correction setting application can communicate with the imaging apparatus 1 via a network.

In step S302, the focus correction setting application determines whether the imaging apparatus 1 to which the focus correction setting application is connected (the imaging apparatus 1 to which the focus correction setting application has connected in step S301) has the focus position shift correction function according to the light source for the imaging apparatus 1.

Specifically, first, the focus correction setting application transmits a light source selection command to select a light source to the imaging apparatus 1. Next, the focus correction setting application receives, as a reply to the transmitted light source selection command, a response indicating a success if the imaging apparatus 1 can execute the light source selection command, or a response indicating a failure if the imaging apparatus 1 cannot execute the light source selection command.

Then, if having received a response indicating a success from the imaging apparatus 1, the focus correction setting application determines that the imaging apparatus 1 has the focus position shift correction function. If, on the other hand, having received a response indicating a failure from the imaging apparatus 1, the focus correction setting application determines that the imaging apparatus 1 does not have the focus position shift correction function.

If the focus correction setting application has determined that the imaging apparatus 1 has the focus position shift correction function, the processing proceeds to step S303. If the focus correction setting application has determined that the imaging apparatus 1 does not have the focus position shift correction function, the processing proceeds to step S304.

In step S303, the focus correction setting application performs the processing without displaying the window 201 on the assumption that it is not necessary to calculate or indicate a focus position correction amount. The window 201 is thus not displayed, which eliminates the need for the user to make unnecessary settings.

In step S304, the focus correction setting application displays the window 201 when connecting to the imaging apparatus 1. This is because, if the imaging apparatus 1 does not have the focus position shift correction function, the focus correction setting application needs to calculate a focus position correction amount for the imaging apparatus 1.

In step S305, the focus correction setting application receives the selection of a light source from the user.

In step S306, the focus correction setting application acquires a camera parameter from the imaging apparatus 1. For example, in the first exemplary embodiment, the focus correction setting application acquires the zoom position from the imaging apparatus 1.

In step S307, the focus correction setting application calculates a focus position correction amount from the wavelength of the light source corresponding to the selection received in step S305 and the camera parameter acquired in step S306. Thus, the focus correction setting application according to the first exemplary embodiment serves as a correction amount determination unit for determining a focus position correction amount.

In step S308, the focus correction setting application transmits the focus position correction amount calculated in step S307 to the imaging apparatus 1.

Then, the imaging apparatus 1 receives the focus position correction amount from the focus correction setting application and adjusts the focus position according to the insertion or removal of the optical filter 102, using the received focus position correction amount.

For example, if the optical filter 102 is to be removed from the optical path of the lens group 101, the imaging apparatus 1 adds the received focus position correction amount to the focus position before the removal, and focuses based on the focus position obtained by the addition. Specifically, if the optical filter 102 is to be removed from the optical path of the lens group 101, the imaging apparatus 1 moves the focus lens to the focus position obtained by the addition.

If, on the other hand, the optical filter 102 is to be inserted into the optical path of the lens group 101, the imaging apparatus 1 subtracts the received focus position correction amount from the focus position before the insertion, and focuses based on the focus position obtained by the subtraction. Specifically, if the optical filter 102 is to be inserted into the optical path of the lens group 101, the imaging apparatus 1 moves the focus lens to the focus position obtained by the subtraction.

As described above, the focus correction setting application according to the first exemplary embodiment is configured to, based on the type of light source selected by the user and the zoom position acquired from the imaging apparatus 1, calculate a focus position correction amount to be used when inserting or removing the optical filter 102.

Based on this, even an imaging apparatus without the focus position shift correction function can achieve the correction of the focus position when inserting or removing the optical filter 102, as appropriate according to the light source for and the zoom position of the imaging apparatus 1. Consequently, it is possible to display a focused image.

Further, in the first exemplary embodiment, the window 201 in FIG. 2 is configured to allow the selection of a focus operation when switching between the day and night modes. Specifically, the window 201 is configured to allow the making of various settings using the item "do not control", the item "execute one-shot AF", and the item "execute correction according to light source". Alternatively, the window 201 may be configured as follows.

That is, the window 201 may be configured such that if the imaging apparatus 1 does not have the function of focusing by performing an AF operation only once when switching between the day and night modes, the window 201 does not display the item "execute one-shot AF". On the other hand, the window 201 may be configured such that if the imaging apparatus 1 has this function, the window 201 displays the item "execute one-shot AF".

In the first exemplary embodiment, the focus correction setting application is configured to, in step S308, transmit the focus position correction amount calculated in step S307 to the imaging apparatus 1. The focus correction setting application, however, is not limited to such a configuration.

For example, the focus correction setting application may be configured to, in step S308, transmit the focus position correction amount calculated in step S307, together with light source information representing the light source corresponding to the selection received in step S305.

Further, the focus correction setting application may be configured to, in step S308, transmit the focus position correction amount calculated in step S307, together with the camera parameter of the imaging apparatus 1 acquired in step S306.

Further, in the first exemplary embodiment, the focus correction setting application is configured such that if the imaging apparatus 1 has the focus position shift correction function, the focus correction setting application does not display the window 201 itself. The focus correction setting application, however, is not limited to such a configuration.

For example, the focus correction setting application may be configured such that even if the imaging apparatus 1 to which the focus correction setting application has connected in step S301 has the focus position shift correction function, the focus correction setting application displays the window 201 so that the focus correction setting application can receive the selection of a light source from the user.

Further, the focus correction setting application may be configured to, without calculating a focus position correction amount, transmit only information representing the light source corresponding to the received selection to the imaging apparatus 1 to which the focus correction setting application has connected in step S301.

Figure 4:
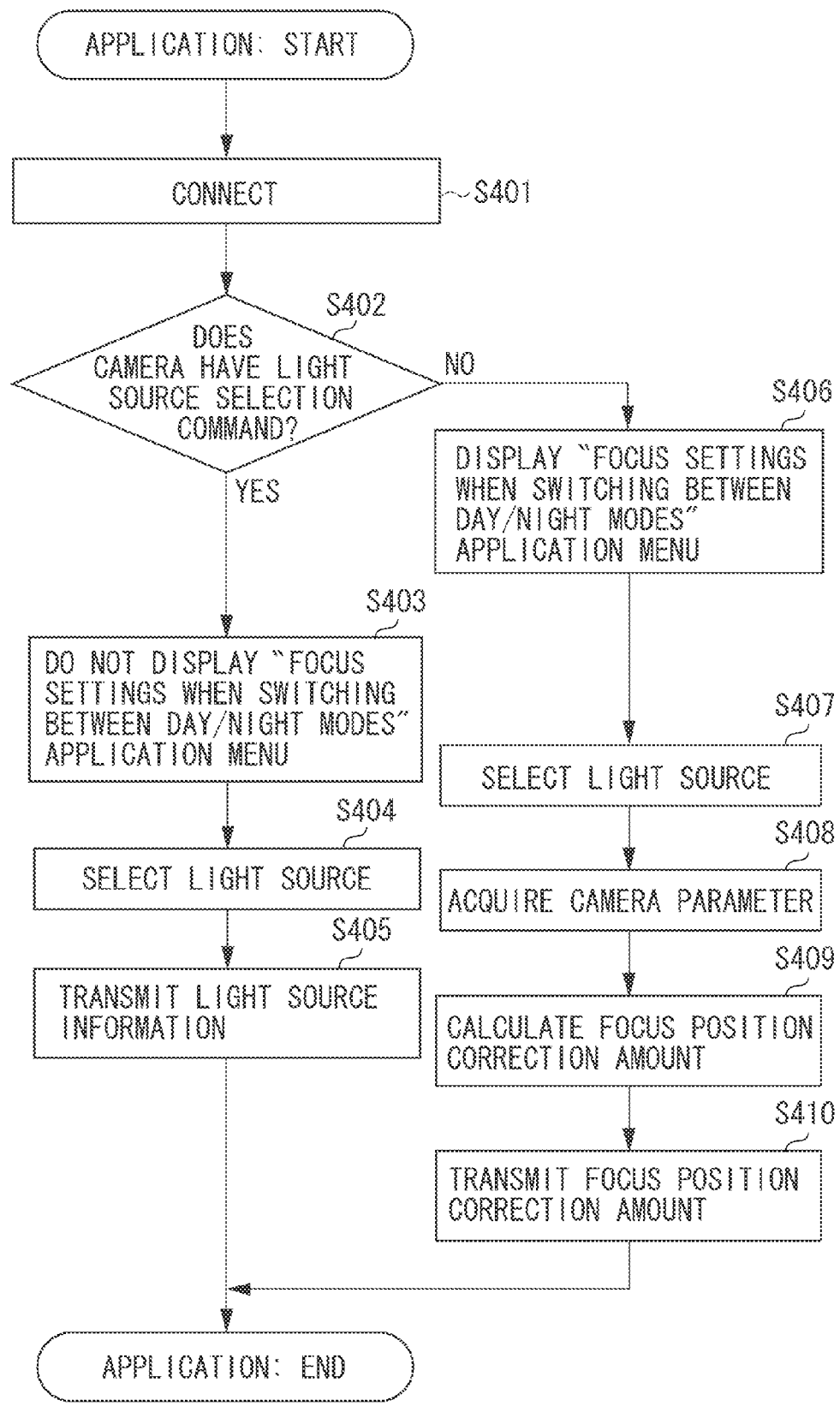
FIG. 4 is a flow chart illustrating a focus position correction process when switching between the day and night modes, according to the first exemplary embodiment of the present invention, and being different from FIG. 3.

FIG. 4 is a flow chart illustrating a focus position correction process when switching between the day and night modes, the process performed by the focus correction setting application configured as described above.

In FIG. 4, steps S401 and S402 are similar to steps S301 and S302 in FIG. 3, and therefore are not described here.

Steps S403 and S404 are similar to steps S304 and S305 in FIG. 3, and therefore are not described here.

In step S405, the focus correction setting application transmits light source information representing the light source corresponding to the selection received in step S404 to the imaging apparatus 1.

Steps S406 to S410 are similar to steps S304 to S308 in FIG. 3, and therefore are not described here.

Further, in the first exemplary embodiment, the focus correction setting application is configured to, in step S302, determine whether the imaging apparatus 1 has the focus position shift correction function, based on whether the imaging apparatus 1 can execute the light source selection command. The focus correction setting application, however, is not limited to such a configuration.

For example, the focus correction setting application may be configured to determine whether the imaging apparatus 1 has the focus position shift correction function, based on information indicating that the imaging apparatus 1 has the focus position shift correction function, such as a determination flag indicating that the imaging apparatus 1 has the focus position shift correction function.

Figure 5:
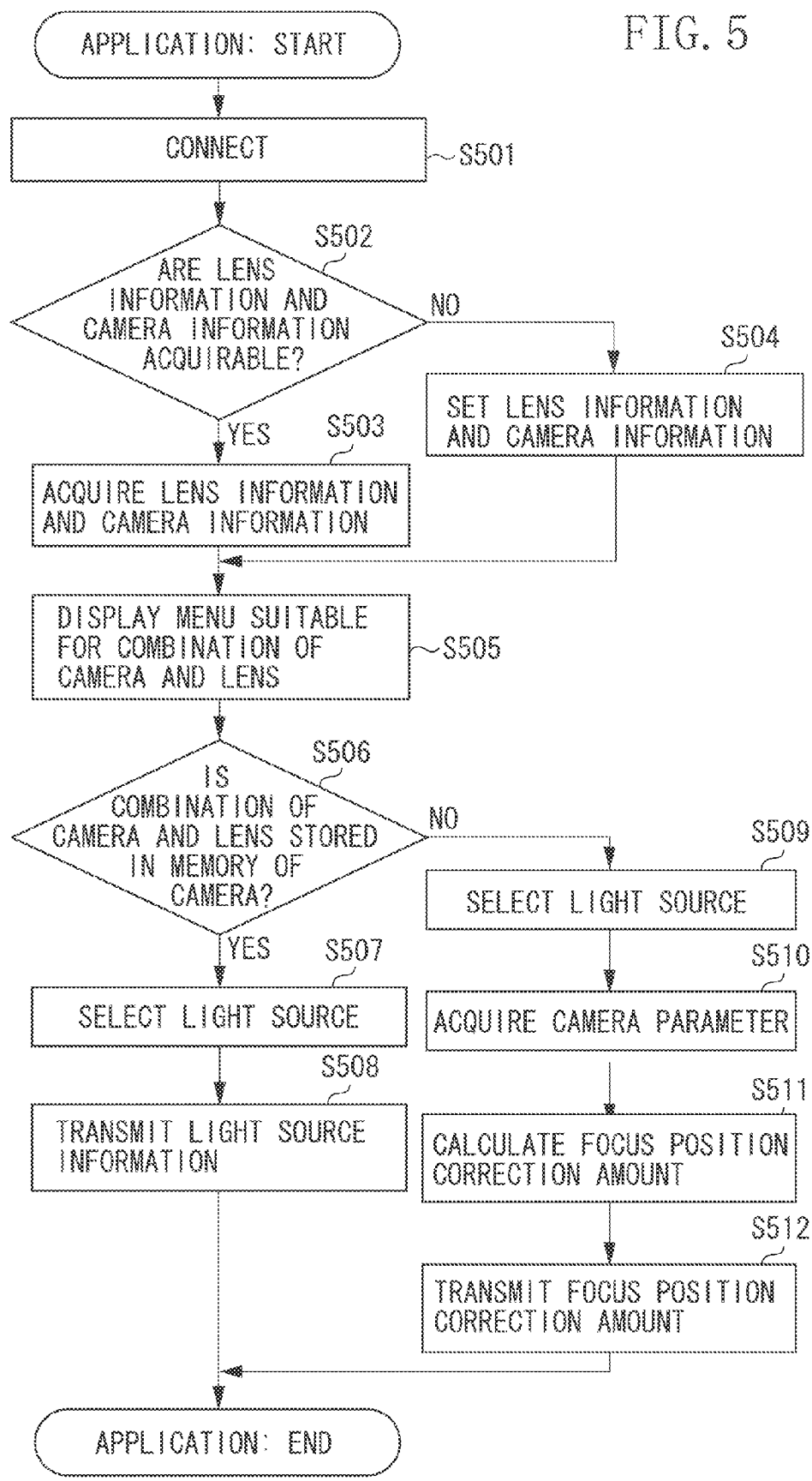
FIG. 5 is a flow chart illustrating a focus position correction process when switching between the day and night modes, according to a second exemplary embodiment of the present invention.

Next, in the second exemplary embodiment of the present invention, with reference to FIG. 5, a description is given of a method of making settings regarding a focus correction when switching between the day and night modes, in the case of assuming an imaging apparatus that allows the exchange of lenses. The components redundant with those of the above exemplary embodiment and the first exemplary embodiment are designated by the same numerals, and the descriptions of the redundant components are appropriately omitted.

First, a shift in the focus caused by the difference between the wavelengths of light sources for a camera depends mainly on the characteristics of a lens and the sensitivity of an image sensor to the wavelengths. Thus, if there is only a fixed one-to-one combination of a lens and an image sensor, the camera can deal with the wavelengths of light sources by having focus position correction amounts only for the number of the light sources (wavelengths).

The situation, however, is different when a camera allows the exchange of lenses and can calculate a focus position correction amount within the camera as in a conventional camera. That is, the camera needs to have, within the camera, focus position correction amounts for the number of the wavelengths of light sources corresponding to the number of the lenses. Thus, the camera results in holding an enormous amount of data.

Further, if a lens other than a lens assumed in advance has been mounted (for example, if a lens is newly designed after the camera body has been designed, and the camera body does not have a focus position correction amount corresponding to the newly designed lens), the camera may not be able to appropriately correct the focus.

In such a case, even if the camera allows the selection of a light source as described in the first exemplary embodiment, the camera cannot appropriately deal with a target light source that has not been assumed in advance by the camera. This is because the focus position correction amount may be inappropriate for the light source due to, for example, an insufficient number of selectable light sources, or an incorrect target light source being selected.

Further, there is a method of updating focus position correction amount tables in cameras so that each camera can individually correct the focus position according to the combination of the lens and the camera. However, it takes a long time to actually set dozens of cameras by such a method, which is impractical.

Further, if a single application calculates focus position correction amounts for a plurality of combinations, the application itself can be commonly used, which is convenient.

To deal with such various problems, the second exemplary embodiment applies the first exemplary embodiment. That is, the focus correction setting application understands the combination of the lens and the camera, calculates a focus position correction amount from the combination, and sets the focus position correction amount in the camera.

FIG. 5 is a flow chart illustrating a focus position correction process when switching between the day and night modes, the process performed by the focus correction setting application according to the second exemplary embodiment. This process is started when the focus correction setting application has been started.

In FIG. 5, step S501 is similar to step S301 in FIG. 3, and therefore is not described here.

In step S502, the focus correction setting application determines whether lens information and camera information are acquirable from the imaging apparatus 1. The "lens information" refers to information for identifying the type of the interchangeable lens mounted on the imaging apparatus 1. The "camera information" refers to information for identifying the type of the imaging apparatus 1.

Then, if the focus correction setting application has determined that the lens information and the camera information are acquirable from the imaging apparatus 1, the processing proceeds to step S503. If, on the other hand, the focus correction setting application has determined that the lens information and the camera information are not acquirable from the imaging apparatus 1, the processing proceeds to step S504.

In step S503, the focus correction setting application automatically acquires the lens information and the camera information from the imaging apparatus 1.

In step S504, the focus correction setting application receives the settings of the lens information and the camera information from the user.

In step S505, the focus correction setting application determines the combination of the imaging apparatus 1 and the lens, and displays a menu screen suitable for the determined combination.

Specifically, after step S503, the focus correction setting application displays a menu screen suitable for the lens information and the camera information acquired in step S503. On the other hand, after step S504, the focus correction setting application displays a menu screen suitable for the lens information and the camera information of which the settings have been received in step S504.

The "menu screen" in step S505 refers to, for example, the screen of the "focus settings when switching between day/night modes" application as illustrated in FIG. 2.

For example, if the lens information indicates an interchangeable lens A, and the camera information indicates an imaging apparatus B, the focus correction setting application displays in the pull-down menu 205 of the window 201 the types of light sources such as fluorescent light, incandescent light, infrared illumination (850 nm), and infrared illumination (950 nm).

If, on the other hand, the lens information indicates an interchangeable lens C, and the camera information indicates an imaging apparatus D, the focus correction setting application displays in the pull-down menu 205 of the window 201 the types of light sources such as fluorescent light, incandescent light, infrared illumination (800 nm), infrared illumination (850 nm), infrared illumination (900 nm), and infrared illumination (950 nm).

In step S506, the focus correction setting application determines whether the combination of the lens information and the camera information acquired in step S503 or set in step S504 is stored in a memory (not illustrated) of the imaging apparatus 1.

Then, if the focus correction setting application has determined that the combination of the lens information and the camera information acquired in step S503 or set in step S504 is stored in the memory of the imaging apparatus 1, the processing proceeds to step S507.

If, on the other hand, the focus correction setting application has determined that the combination of the lens information and the camera information acquired in step S503 or set in step S504 is not stored in the memory of the imaging apparatus 1, the processing proceeds to step S509.

Step S507 is similar to step S305 in FIG. 3, and therefore is not described here.

Step S508 is similar to step S405 in FIG. 4, and therefore is not described here.

Steps S509 to S512 are similar to steps S305 to S308 in FIG. 3, and therefore are not described here.

As described above, in the second exemplary embodiment, the focus correction setting application determines the combination of the body of the imaging apparatus 1 and the lens group 101, which is an interchangeable lens attachable to and detachable from the body. Then, the focus correction setting application calculates a focus position correction amount according to the determined combination.

Based on this, even with any combination of the camera and the interchangeable lens attachable to and detachable from the camera body, it is possible to correct the shift in the focus position caused by inserting or removing an optical filter, and to display a focused image. Additionally, it is possible to correct the shift without storing, in the imaging apparatus 1, focus position correction data of all interchangeable lenses attachable to and detachable from the body of the imaging apparatus 1, and without directly changing correction amount calculation data of the imaging apparatus 1.

In the first and second exemplary embodiments, the methods of setting a light source for the imaging apparatus 1 are described. In the third exemplary embodiment of the present invention, a method of confirming the light source set for the imaging apparatus 1 is described. The components redundant with those of the above exemplary embodiment and the first and second exemplary embodiments are designated by the same numerals, and the descriptions of the redundant components are appropriately omitted.

In the third exemplary embodiment, the imaging apparatus 1 is assumed that it includes a memory for storing light source information. This memory is used to store the light source information transmitted from the focus correction setting application in step S405 in FIG. 4.

When the focus correction setting application has been started, the focus correction setting application acquires light source information from the imaging apparatus 1. Then, based on the acquired light source information, the focus correction setting application displays in a distinguishable manner the light source currently selected in the imaging apparatus 1.

Specifically, the focus correction setting application displays, among the types of light sources displayed in the pull-down menu 205 of the window 201, the type of light source corresponding to the light source information acquired from the imaging apparatus 1, such that the corresponding type of light source is in a selected state. Further, the focus correction setting application displays, among the types of light sources displayed in the pull-down menu 205, the types of light sources different from the type of light source corresponding to the light source information acquired from the imaging apparatus 1, such that these types of light sources are not in selected states.

As described above, in the third exemplary embodiment, the focus correction setting application determines the type of light source for the imaging apparatus 1, and displays the determined type of light source in the window 201 in a distinguishable manner. This enables the user to distinguish the light source currently selected in the imaging apparatus 1.

Further, in the third exemplary embodiment, the focus correction setting application is configured to acquire the light source information stored in the memory provided in the imaging apparatus 1, and to determine the light source for the imaging apparatus 1. The focus correction setting application, however, is not limited to such a configuration.

For example, the focus correction setting application may be configured such that the imaging apparatus 1 stores the representative values of focus position correction amounts corresponding to various light sources, and the focus correction setting application acquires one of the stored representative values from the imaging apparatus 1, and determines the light source for the imaging apparatus 1 based on the acquired representative value.

Further, in the third exemplary embodiment, light source information is stored in the memory provided in the imaging apparatus 1. This enables the determination of the currently set light source within the imaging apparatus 1 (also by the imaging apparatus 1 itself). Additionally, various applications other than the focus correction setting application can determine and confirm the light source currently set in the imaging apparatus 1, by acquiring the stored light source information.

Further, in the above exemplary embodiment and the first to third exemplary embodiments, a focus position correction amount is calculated from parameters such as the light source for and the zoom position of the imaging apparatus 1, but the exemplary embodiments are not limited to this.

For example, the imaging apparatus 1 and the focus correction setting application may be configured to acquire (read) a focus position correction amount corresponding to parameters such as the light source for and the zoom position of the imaging apparatus 1, from the focus position correction amount table as illustrated in FIG. 7.

The focus position correction amount table illustrated in FIG. 7 is a table in which focus position correction amounts are associated with light sources and zoom positions. The focus position correction amount table may be configured to be held in a memory provided in the imaging apparatus 1 or the external setting unit 117. Such a memory provided in the imaging apparatus 1 or the external setting unit 117 corresponds to a holding unit for holding focus position correction amounts with respect to various light sources.

In the columns for fluorescent light, the columns for incandescent light, the columns for infrared illumination (850 nm), and the columns for infrared illumination (950 nm) in the focus position correction amount table illustrated in FIG. 7, a zoom position and a focus position correction amount are stored.

In each column for the zoom position, for example, a value representing the zoom position is stored such that the value is 1 at the wide-angle end and increases (2, 3, 4, 5 . . . ) from the wide-angle end to the telephoto end. Further, in each column for the focus position correction amount, for example, the number of steps for driving a stepper motor for moving the lens group 101 is stored.

Further, the present invention is achieved also by performing the following process. That is, this is the process of supplying software (a program) for achieving the functions of the above exemplary embodiment and the first to third exemplary embodiments to a system or an apparatus via a network or various storage media, and causing a computer (or a central processing unit (CPU) or a microprocessor unit (MPU)) of the system or the apparatus to read and execute the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-274581 filed Dec. 17, 2012, which is hereby incorporated by reference herein in its entirety.

What is claimed is:

1. An external apparatus capable of communicating with an imaging apparatus that corrects a shift in a focus position caused by inserting or removing an optical filter into or from an optical path of an imaging optical system, the external apparatus comprising:
   a selector for selecting a light source for an object of the imaging apparatus;
   an acquisition unit configured to acquire, from the imaging apparatus, setting information related to correcting the shift in the focus position;
   a determination unit configured to determine a setting parameter based on the setting information acquired from the imaging apparatus and the light source selected by using the selector; and
   a transmission unit configured to transmit a command that includes the setting parameter determined by the determination unit to the imaging apparatus.

2. The external apparatus according to claim 1, wherein the setting information includes at least a zoom position of the imaging apparatus.

3. The external apparatus according to claim 1, wherein the setting information includes a combination of lens information and camera information of the imaging apparatus.

4. The external apparatus according to claim 3, wherein the camera information from the imaging apparatus includes information for identifying a type of an interchangeable lens mounted on the imaging apparatus.

5. The external apparatus according to claim 1, further comprising a detection unit configured to detect, by the setting information, whether the imaging apparatus has a function to correct a focus position by inserting or removing the optical filter or not.

6. The external apparatus according to claim 1, wherein, the setting parameter includes at least either of a correction amount to correct the shift in the focus position or the light source information selected by using the selector.

7. The external apparatus according to claim 1, further comprising a display unit configured to display at least a setting application for making settings regarding an imaging unit of the imaging apparatus.

8. The external apparatus according to claim 7, further comprising a display control unit configured to change contents of the setting application to be displayed on a display unit, in accordance with the setting information acquired from the imaging apparatus.

9. The external apparatus according to claim 7, wherein the selector includes a menu and a button which are displayed in the display unit.

10. An external apparatus capable of communicating with an imaging apparatus that corrects a shift in a focus position caused by inserting or removing an optical filter into or from an optical path of an imaging optical system, the external apparatus comprising:
    a selector for selecting a light source for an object of the imaging apparatus;
    a transmission unit configured to transmit, to the imaging apparatus, a command including a setting parameter that is determined based on the light source selected by the selector to control the imaging apparatus; and
    a display control unit configured to, if the zoom position of the imaging apparatus has been changed after the light source had been selected by using the selector, cause a display unit to display a message prompting the user to select a light source anew.

11. The external apparatus according to claim 10, wherein the display control unit, when the light source is selected using the selector, prohibits the imaging direction from being changed using a changing unit.

12. The external apparatus according to claim 10, further comprising a determination unit configured to determine the setting parameter based on setting information acquired from the imaging apparatus and the light source selected by using the selector.

13. The external apparatus according to claim 12, wherein the setting information includes at least a zoom position of the imaging apparatus.

14. The external apparatus according to claim 12, wherein the setting parameter includes at least either of a correction amount to correct the shift in the focus position or the light source information selected by using the selector.

* * * * *